(12) United States Patent
Bolz et al.

(10) Patent No.: US 7,312,596 B2
(45) Date of Patent: Dec. 25, 2007

(54) DEVICE AND METHOD FOR EQUALISING THE CHARGE OF SERIALLY CONNECTED CAPACITORS BELONGING TO A DOUBLE LAYER CAPACITOR

(75) Inventors: Stephan Bolz, Pfatter (DE); Martin Götzenberger, Ingolstadt (DE); Rainer Knorr, Regensburg (DE); Günter Lugert, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/587,921

(22) PCT Filed: Jan. 7, 2005

(86) PCT No.: PCT/EP2005/050050

§ 371 (c)(1),
(2), (4) Date: Aug. 28, 2006

(87) PCT Pub. No.: WO2005/074092

PCT Pub. Date: Aug. 11, 2005

(65) Prior Publication Data

US 2007/0127274 A1 Jun. 7, 2007

(30) Foreign Application Priority Data

Feb. 2, 2004 (DE) .................... 10 2004 005 136

(51) Int. Cl.
*H02J 7/00* (2006.01)
*H02M 3/335* (2006.01)

(52) U.S. Cl. .................... 320/120; 320/140; 363/21.12
(58) Field of Classification Search ................ 320/120, 320/140, 166; 307/109; 363/16, 20, 21.01, 363/21.12, 21.13, 95
See application file for complete search history.

(56) References Cited

U.S. PATENT DOCUMENTS

| 5,754,028 A | 5/1998 | Vezzini |
| 5,835,367 A * | 11/1998 | Pan et al. ...................... 363/61 |
| 6,320,362 B1 * | 11/2001 | Baek et al. .................. 323/289 |
| 6,400,124 B1 * | 6/2002 | Hidaka et al. .............. 320/145 |
| 6,586,910 B2 * | 7/2003 | Matsui et al. ................ 320/122 |

FOREIGN PATENT DOCUMENTS

| DE | 197 08 842 A1 | 9/1998 |
| DE | 101 57 003 A1 | 5/2002 |
| EP | 0 432 639 B1 | 6/1991 |
| EP | 0 432 639 A2 | 6/2001 |

* cited by examiner

*Primary Examiner*—Adolf Berhane
(74) *Attorney, Agent, or Firm*—Laurence A. Greenberg; Werner H. Stemer; Ralph E. Locher (57) ABSTRACT

A device and a method are provided for equalizing the charge of the capacitors belonging to a double layer capacitor. The device includes an individual transformer associated with each individual capacitor and a flyback transformer or a spool, from which the energy is transferred, via the individual transformers, to the individual transformer, by the respective low charge. Conclusions on the state of the double layer capacitor and the charge-equalizing switch are derived from the measured charging time and discharging time of the flyback transformer.

18 Claims, 4 Drawing Sheets

DEVICE AND METHOD FOR EQUALISING THE CHARGE OF SERIALLY CONNECTED CAPACITORS BELONGING TO A DOUBLE LAYER CAPACITOR

BACKGROUND OF THE INVENTION

Field of the Invention

The invention relates to a device for equalizing the charge of the serially connected capacitors belonging to a double layer capacitor, particularly in a motor vehicle electrical system.

The invention also relates to a method for operating this device.

Double layer capacitors have proved to be the most favorable technical solution for the storage and delivery of short-term high power levels in a motor vehicle electrical system, for example with regard to acceleration support (boosting) for the internal combustion engine by means of an integrated starter/generator functioning as an electric motor or to the conversion of kinetic energy into electrical energy during the regenerative braking process (recuperation) by means of an integrated starter/generator functioning as a generator.

The maximum voltage of a single capacitor of a double layer capacitor is limited to about 2.5V to 3.0V, with the result that for a voltage of for example 60V—a typical voltage value for a double layer capacitor used in a 42V vehicle electrical system—about 20 to 25 single capacitors need to be serially connected to form a capacitor stack.

Dependent on the differences in the spontaneous discharge of the single capacitors (in the region of about 5% to 8% within 16 hours), a charge imbalance builds up in the capacitor stack over the course of time which ultimately renders the double layer capacitor unusable unless a charge equalization is performed. If the discharge curve is extrapolated to periods of weeks and months, which are relevant in the case of motor vehicles, then the existing problem becomes obvious.

It is not however possible to perform a simple charge equalization for a double layer capacitor, for example by slightly overcharging the stack as in the case of a lead-acid accumulator.

With regard to a large number of serially connected accumulators, a method is known from EP 0 432 639 B2 for performing a charge equalization between a weakly charged accumulator and the group of remaining accumulators by providing for each individual accumulator in the accumulator stack a comparator circuit and a charging circuit, which includes a squarewave function generator, and also a diode, a transformer and a contact breaker. By means of this device functioning as a flyback converter (using the isolating transformer principle), energy is removed from the entire stack and this is subsequently fed back into the most discharged accumulator.

This effort may be justified for two or three accumulators, but it is decidedly too high for a stack comprising twenty or more accumulators/capacitors.

SUMMARY OF THE INVENTION

The object of the invention is to create a device having a simplified structure which can be used to achieve self-controlled operation for charge equalization between the single capacitors in the capacitor stack of a double layer capacitor with limited engineering effort. The object of the invention is also to specify a method for operating this device which enables functional monitoring of the device and of the capacitor stack to be performed.

This object is achieved according to the invention by a device according to the features described in claim 1 or 2 and a method according to the features described in claim 5.

Advantageous developments of the invention are set down in the subclaims.

BRIEF DESCRIPTION OF THE DRAWINGS

Embodiments according to the invention will be described in detail in the following with reference to a schematic drawing. In the drawings.

DESCRIPTION OF THE PREFERRED EMBODIMENTS

Figure 1:
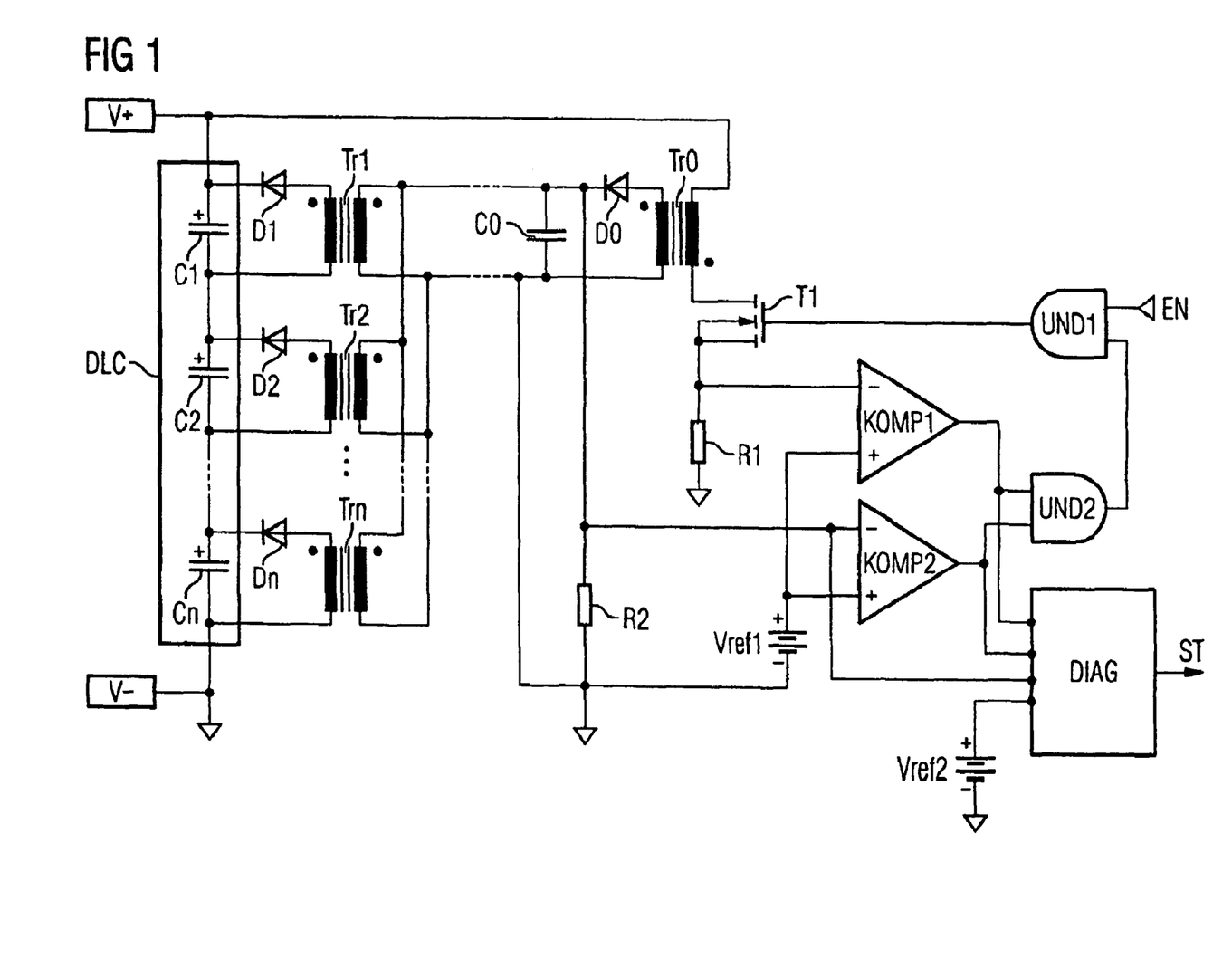
FIG. 1 shows the circuit of a first embodiment according to the invention.

FIG. 1 shows the circuit of a first embodiment according to the invention with a double layer capacitor DLC having one positive and one negative terminal V+ and V−, and consisting of n serially connected single capacitors C1 to Cn.

The circuit has a flyback transformer Tr0 whose primary and secondary windings are wound in phase opposition to one another and which has the function of a magnetic energy store. The spots drawn in for the transformers in FIGS. 1 and 4 denote the respective start of the winding.

The primary winding of the flyback transformers Tr0 is connected on the one hand to the positive terminal V+ and on the other hand to the drain terminal of a switching transistor T1 taking the form for example of a MOSFET. The switching transistor T1 can however also take the form of a bipolar transistor with base, emitter and collector terminals. The source terminal of the switching transistor T1 is connected on the one hand to the inverting input of a first voltage comparator KOMP1 and on the other hand by way of a first resistor R1 to the negative terminal V− which is at the reference potential (ground) of the circuit.

The gate terminal of the switching transistor T1 is connected to the output of a first AND element UND1, to whose one input a control signal EN which is supplied by an external control logic circuit that is not shown is fed, and whose other input is connected to the output of a second AND element UND2.

The noninverting input of the first voltage comparator KOMP1 is connected to a single-ended reference voltage Vref1 and its output is connected to an input of the second AND element UND2 and to a first input of a monitoring unit DIAG (diagnosis).

One terminal of the secondary winding of the flyback transformer Tr0 is connected directly, the other terminal by way of a first diode D0 and a second resistor R2, to the negative terminal V−. A first capacitor C0 is connected on the one hand to the cathode of the first diode D0 and on the other hand to the negative terminal V−. The connection point of the cathode of the first diode D0 and the second resistor R2 is connected to the inverting input of a second voltage comparator KOMP2, whereas the reference voltage Vref1 is applied to the latter's noninverting input.

The output of the second voltage comparator KOMP2 is connected on the one hand to the other input of the second AND element UND2 and on the other hand to a second input of the monitoring unit DIAG.

A third input of the monitoring unit DIAG is connected to the inverting input of the second voltage comparator KOMP2 and a second single-ended reference voltage Vref2 is applied to a fourth input of the monitoring unit DIAG. The output of the monitoring unit DIAG delivers a status signal ST which is monitored by an external evaluation logic circuit, not shown, which will be described in detail later.

Each single capacitor C1 to Cn of the double layer capacitor DLC is assigned a single transformer Tr1 to Trn which is wound in-phase (primary and secondary windings are wound in-phase with respect to one another).

The start of winding of the secondary winding of each single transformer Tr1 to Trn is connected by way of a single diode D1 to Dn to the positive terminal +C1 to +Cn of the single capacitor C1 to Cn associated with it, while the other terminal is connected directly to the other (negative) terminal of the single capacitor C1 to Cn associated with it.

The primary windings of the single transformers Tr1 to Trn are connected in parallel, whereby the common start of winding is connected to the cathode of the first diode D0 and the common end of winding is connected to negative terminal V− (reference potential) and to the end of winding of the secondary winding of the flyback transformer Tr0. In this situation, the connection between the flyback transformer (Tr0) and the single transformers is implemented by means of a two-wire bus cable.

The method for operating this device is described in the following with reference to signal waveforms illustrated in FIGS. 2a to 2e (voltages) and also 3a and 3b (currents) for selected points of the circuit. It is assumed in this situation that the nominal voltage of the double layer capacitor DLC=10V, and the nominal voltage of a single capacitor =2.5V, where n=4. A charge equalization takes place here from the overall voltage of the double layer capacitor DLC, but can also take place from other energy storage devices as soon as any such are connected to the double layer capacitor DLC, which is not however shown in FIG. 1.

Figure 2A:
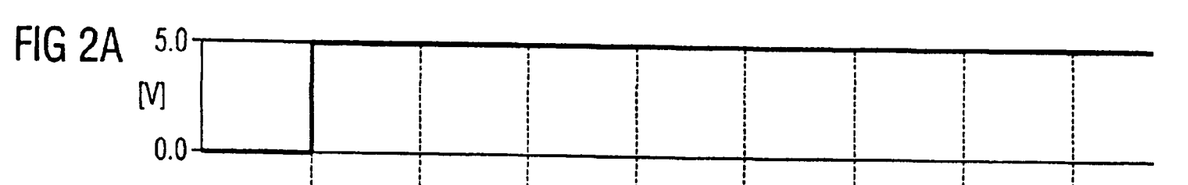
FIG. 2 shows voltage waveforms for selected points of this circuit.
Figure 2B:
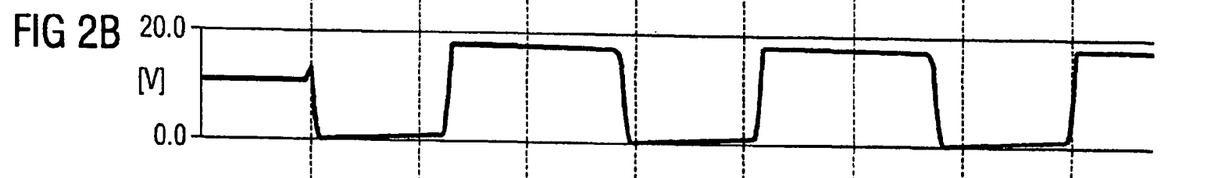

By means of the aforementioned control signal EN (FIG. 2a, start at point in time t=1 μs), for the duration of the latter the switching transistor T1 is released by way of the AND element UND1 (FIG. 2b shows the voltage at the drain terminal of the switching transistor T1; up to point in time t=1 μs the voltage at the drain terminal is +10V, at point in time t=1 μs it drops to approximately 0V). If the control signal EN and the output of the AND element UND2 are High level, then switching transistor T1 is made conducting (FIG. 2e, t=1 μs)

Figure 2C:
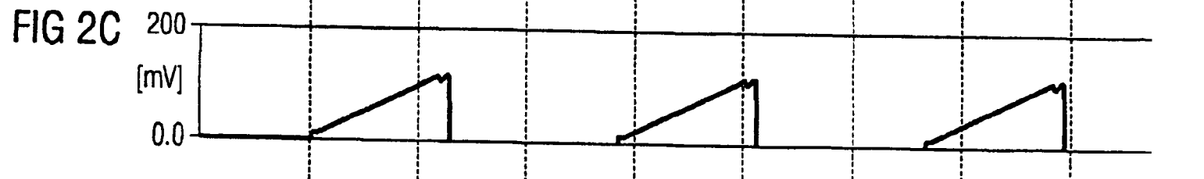

A current begins to flow from the positive terminal V+ through the primary winding of the flyback transformers Tr0, through the switching transistor T1 and the first resistor R1 to the negative terminal V− (FIG. 3a), whereby a voltage proportional to this current is present at the first resistor R1 (FIG. 2c).

The voltage present at the first resistor R1 rises as the current flow increases, in other words also as charging of the core of the flyback transformer Tr0 increases. If it reaches the value of the reference voltage Vref1 at point in time t≅2.2 μs, then the voltage comparator KOMP1 switches its output from High to Low level, whereupon the output of the AND element UND" likewise goes to Low level and thus makes the switching transistor nonconducting. The voltage comparator KOMP1 is thus used for sensing the primary current of the flyback transformer Tr0.

Since the current flowing through the first resistor R1 now drops rapidly, the voltage present at it is also reduced and drops below the value of the reference voltage Vref1. The output from KOMP1 would now immediately return to High level, as a result of which switching transistor T1 would again be made conducting.

In order to prevent this, the voltage jump occurring on the secondary side when switching off the flyback transformer Tr0 is detected and used in order to keep switching transistor T1 nonconducting until the flyback transformer Tr0 has been completely discharged.

When the switching transistor T1 is made nonconducting, the voltage of the primary side of the flyback transformer Tr0 rises—driven by the energy stored in its core—beyond the voltage at the positive terminal V+. The voltage at its secondary side rises likewise; the current caused by it flows by way of the first diode D0 operated in the forward direction (FIG. 2d) and at the second resistor R2 generates a proportional voltage whose rate of rise is determined by the charging of the first capacitor C0. This voltage reaches the inverting input of the voltage comparator KOMP2. The latter is thus used for sensing the secondary voltage of the flyback transformer Tr0.

As long as this voltage is greater than the reference voltage Vref1, the output from the voltage comparator KOMP2 switches to Low level, such that switching transistor T1 remains nonconducting by way of the AND elements UND2 and UND1. Only when the flyback transformer Tr0 is completely discharged and the voltage breaks down on its secondary side does the voltage at the inverting input of the voltage comparator KOMP2 drop below the reference voltage Vref1, whereupon its output goes to High level and makes the switching transistor T1 conducting again by way of the AND elements UND2 and UND1.

The fact that the voltage at the secondary winding of the flyback transformer Tr0 becomes negative when the switching transistor T1 is made conducting is unimportant in this situation because the first diode D0 is now blocking.

After the switching transistor T1 is made nonconducting, the energy stored in the flyback transformer Tr0 flows by way of the secondary winding of the flyback transformer Tr0 and the first diode D0 to the first capacitor C0 and to the parallel-connected primary windings of the small single transformers Tr1 to Trn and thence by way of their secondary windings and also the single diodes D1 to Dn to the single capacitors C1 to Cn.

The rapid current rise in the secondary winding of the flyback transformer Tr0 associated with making the switching transistor T1 nonconducting initially charges the first capacitor C0. By this means, the magnetizing inductances of the single transformers Tr1 to Trn receive sufficient time to build up current such that a current can ultimately also flow on their secondary sides.

On the secondary side of a single transformer, Tr1 for example, a voltage is thus produced which corresponds to the sum of the charging voltage of the single capacitor C1 and the forward voltage of the single diode D1. This is also the case in the same manner for the secondary voltages of the transformers Tr2 to Trn. A typical value for this voltage is for example 3.2V, whereby the charging voltage of C1 is 2.5V and the forward voltage of D1 is 0.7V. When Schottky diodes are used, the diode forward voltage is only about 0.3V.

The primary voltage of each single transformer is given by the respective secondary voltage and the transformation ratio —which is set to be identical for each single transformer Tr1 to Trn.

It follows from this that different primary voltages for the transformers Tr1 to Trn also result for different charging voltages of the single capacitors C1 to Cn.

However, since the primary windings of all the transformers Tr1 to Trn are now connected in parallel, this necessarily results in a uniform primary voltage—and thus also a uniform secondary voltage.

In this situation, this uniform primary voltage is caused by the single capacitor, C1 for example, having the lowest charging voltage because the latter actually also produces the lowest primary voltage at the single transformer Tr1 assigned to it.

This uniform primary voltage is also present—transformed with the reciprocal transformation ratio of the transformers —at the secondary sides of all the other transformers Tr2 to Trn.

However, since this voltage is now lower than the sum of the charging voltage of the respective single capacitor C2 to Cn and the forward voltage of the assigned single diode, these single diodes D2 to Dn will not conduct and the single capacitors C2 to Cn receive no charging current. Rather, the current coming from the secondary side of the flyback transformer Tr0 essentially flows to the single capacitor (C1) with the lowest voltage as a charging current.

During the course of the charging process the voltage of this capacitor will now rise and it reaches the value of the capacitor with the second lowest voltage. From this point on the single diode assigned to this capacitor also becomes conducting and this capacitor too receives a part of the charging current. Therefore, from this point on the voltages of both capacitors will rise until their voltage reaches the value of the capacitor with the third lowest voltage, etc.

This process is repeated until all the capacitors C1 to Cn in the stack ultimately have the same voltage. With that, the charging process is then completed.

By means of the monitoring circuit DIAG, the signal duration=charging time which can be measured at the output of the voltage comparator KOMP1 and the signal duration=discharging time for the flyback transformer Tr0 which can be measured at the output of the voltage comparator KOMP2 are measured and compared with predefined upper and lower limit values.

If the measured times lie within the predefined limit values, then it can be assumed that the double layer capacitor DLC and the charge equalizing circuit are in a perfect state. Faults such as a short circuit or open circuit in individual single capacitors can be easily detected in this manner.

Figure 2D:
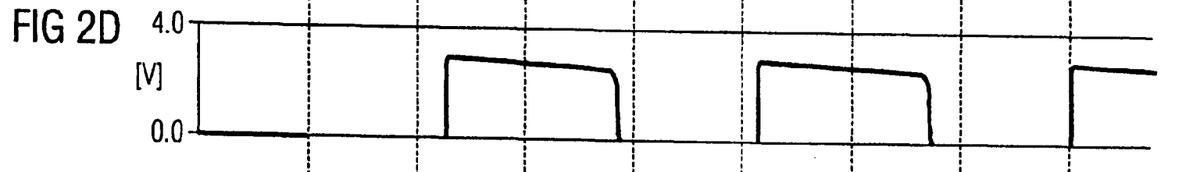
Figure 2E:
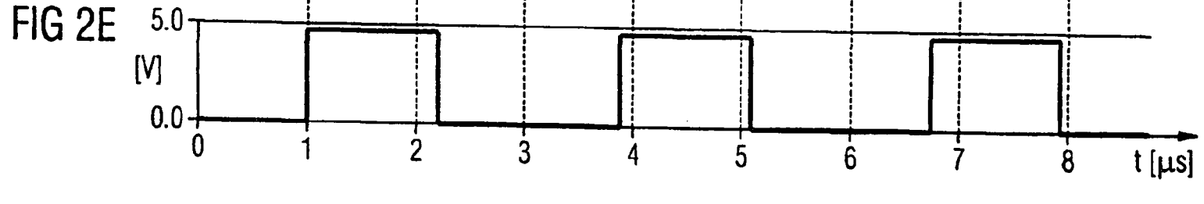
Figure 3A:
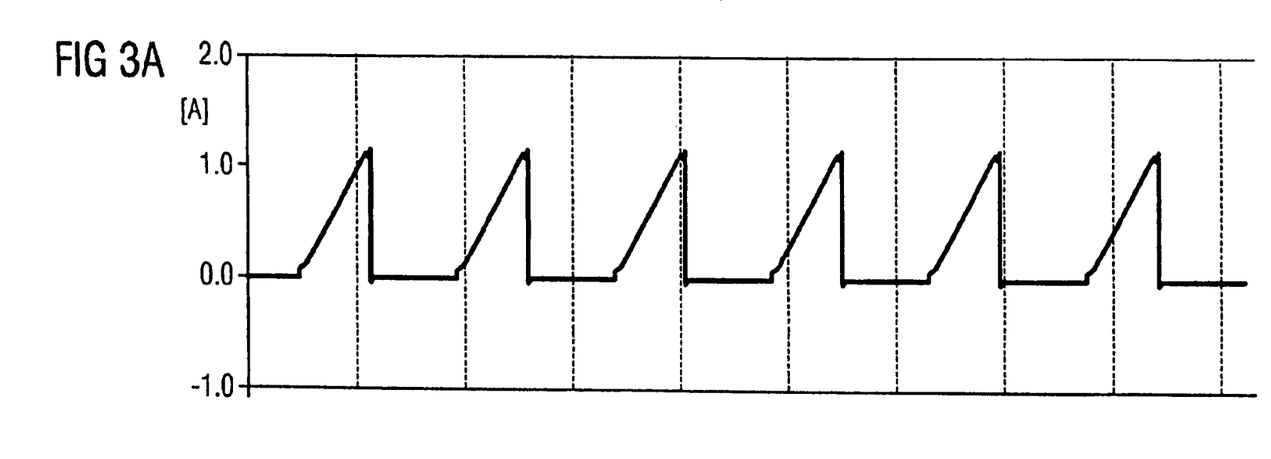
FIG. 3 shows current waveforms for selected points of this circuit.
Figure 3B:
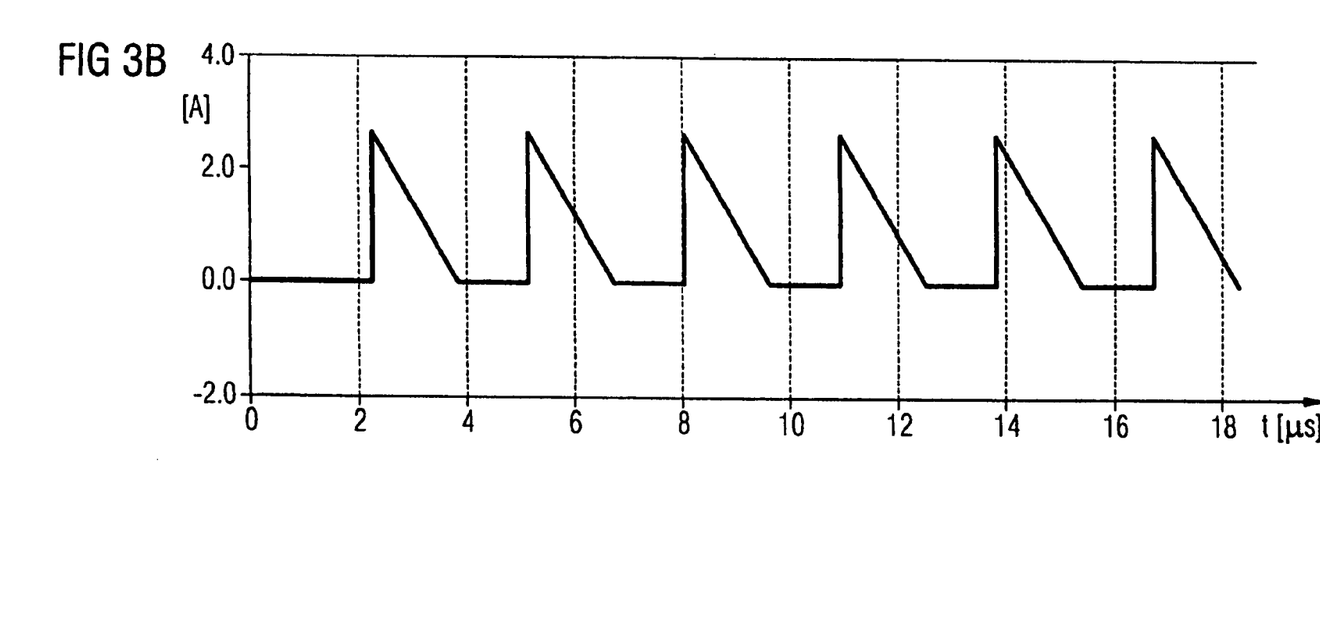

An additional measurement of the rectified secondary voltage of the flyback transformer Tr0 (FIG. 2d) furthermore permits detection of the lowest voltage of a single capacitor C1 to Cn by, for example, capturing the amplitude in the timing dimensions according to FIG. 2d, approximately 0.2 μs to 1.0 μs after the rise in the voltage and the transient reaction. This value is proportional to the currently smallest voltage of a single capacitor.

A comparison of this value with predefined upper and lower limit values likewise provides information about the operation of the double layer capacitor DLC.

The overall status of the double layer capacitor DLC captured in this manner is displayed on the output of the monitoring unit DIAG by means of a status signal ST with the corresponding level. This status signal ST indicates whether the double layer capacitor DLC is functioning fault-free or whether a visit to a workshop is required for investigation or repair.

Figure 4:
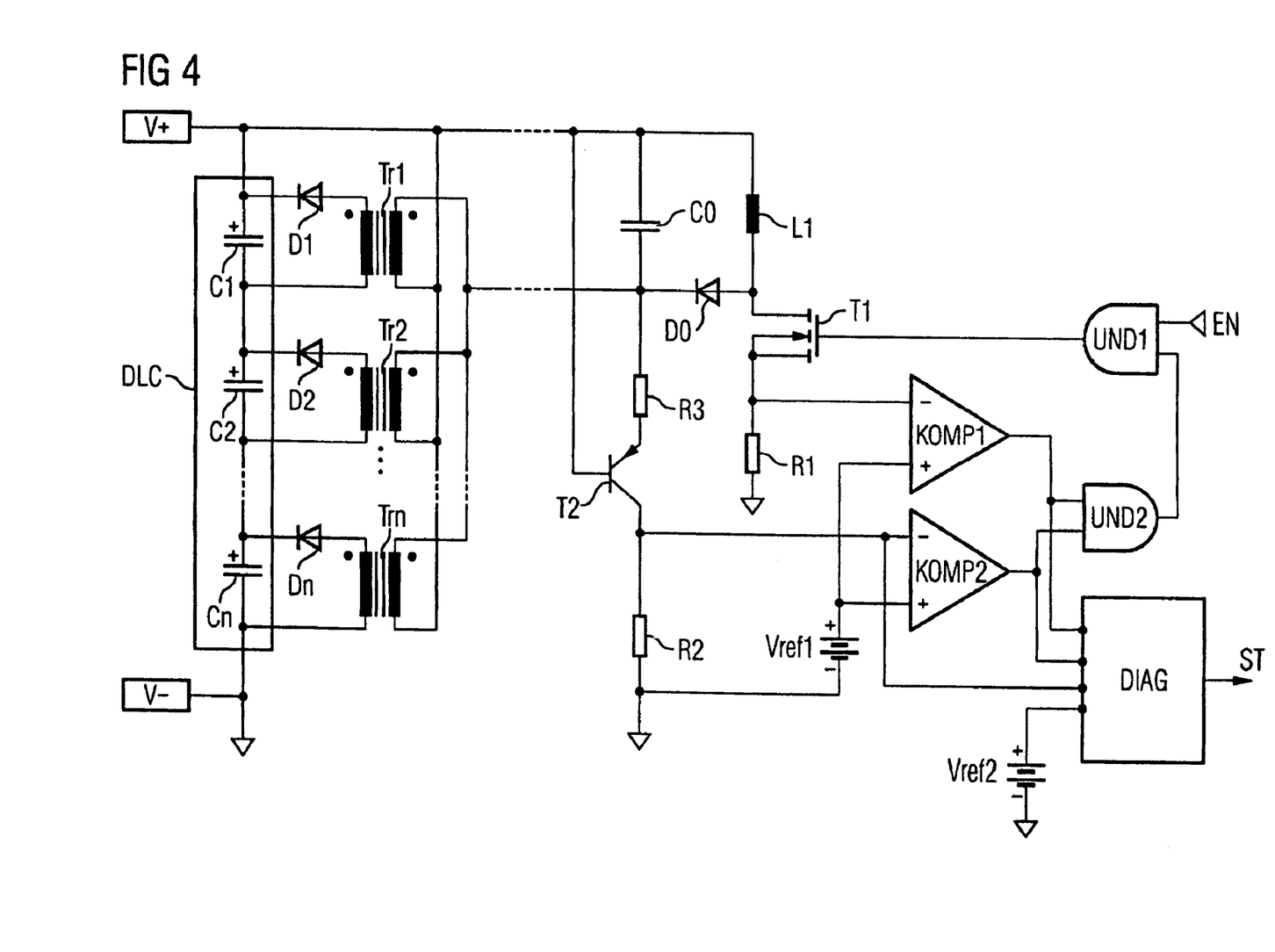
FIG. 4 shows the circuit of a second embodiment of the invention.

FIG. 4 shows the circuit for a second embodiment according to the invention, which is essentially identical to the circuit according to FIG. 1, apart from the fact that in it the flyback transformer Tr0 is replaced by an inductor L1 and a transistor T2, for example a PNP transistor, and a third resistor R3, are additionally added.

At the point at which the flyback transformer Tr0 was to be found in FIG. 1, the circuit includes an inductor L1. The one terminal of the inductor L1 is connected to the positive terminal V+ and the other terminal is connected on the one hand to the drain terminal of the switching transistor T1 and on the other hand by way of a first diode D0 and a third resistor R3 to the emitter terminal of a transistor T2 operated as a level converter, whose base terminal is connected to the positive terminal V+ and whose collector terminal is connected to the second resistor R2 and the inverting input of the voltage comparator KOMP2. The first capacitor C0 is connected on the one hand to the cathode terminal of the first diode D0 and on the other hand to the positive terminal V+.

The connection between the primary windings of the single transformers Tr1 to Trn and the inductor L1 is implemented such that the interconnected starts of windings are connected to the connection point of first diode D0 and third resistor R3, and that the interconnected ends of windings are connected to the positive terminal V+.

The remainder of the circuit is, as already mentioned, identical to that according to FIG. 1. With regard to this embodiment too, the connection between the inductor (L1) and the single transformers is implemented by means of a two-wire bus cable.

With regard to this circuit, the measurement of the discharging voltage of the inductor L1 must be related to the voltage present at the positive terminal V+, which is done by means of the PNP transistor T2 operated as a level converter.

If switching transistor T1 has been made conducting and its drain voltage is therefore low, then the first diode D0 is blocking and thus prevents a current from flowing from the inductor L1 through the base/emitter diode of transistor T2 in the inverse direction.

Since the base voltage of transistor T2, which is at the potential of the positive terminal V+, is now higher than its emitter voltage, transistor T2 is turned off and the voltage at R2 or at the inverting input of the voltage comparator KOMP2 is 0 volts.

If the voltage at the inductor L1 jumps above the potential at the positive terminal V+ after the switching transistor T1 has become nonconducting, then the first diode D0 is made conducting and a current begins to flow from the inductor L1 by way of the first diode D0, the third resistor R3, transistor T2 and the second resistor R2 to the negative terminal V− (reference potential).

At the second resistor R2 this current generates a positive voltage which, as described in the case of the embodiment according to FIG. 1, is higher than the reference voltage Vref1, with the result that the output from the voltage comparator KOMP2 switches to Low level, which ultimately makes switching transistor T1 nonconducting, by way of the AND elements UND2 and UND1.

Only when the inductor L1 is completely discharged does its discharging voltage drop to almost reference potential, whereupon the current flow through the second resistor R2 breaks down and switching transistor T1, as described in the case of the embodiment according to FIG. 1, is made conducting again.

The remainder of the mode of functioning of the circuit and the method for operating the circuit are identical to the case of the embodiment according to FIG. 1, as already described further above.

We claim:

1. A device for equalizing a charge of serially connected capacitors belonging to a double layer capacitor, the double layer capacitor further having a positive terminal and a negative terminal, the device comprising:
   a plurality of single diodes;
   a switching transistor having a collector/drain terminal, a base/gate terminal and an emitter/source terminal;
   a first diode;
   a first resistor having a first terminal and a second terminal connected to the negative terminal of the double layer capacitor;
   a second resistor;
   a flyback transformer having a primary winding and a secondary winding wound in phase-opposition to one another, an end of winding of said primary winding connected to the positive terminal of the double layer capacitor and a start of said winding of said primary winding connected to said collector/drain terminal of said switching transistor, an end of said secondary winding of said flyback transformer connected directly to the negative terminal of the double layer capacitor, a start of said secondary winding connected by way of a series connection of said first diode and said second resistor to the negative terminal of the double layer capacitor;
   a first voltage comparator having an inverting input connected to said emitter/source terminal of said switching transistor and to said first terminal of said first resistor, an output, and an noninverting input receiving a first reference voltage;
   a first AND element having an output connected to said base/gate terminal of said switching transistor, first input receiving an external control signal, and a second input;
   a second AND element having an output connected to said second input of said first AND element, a first input connected to said output of said first voltage comparator, and a second input;
   a second voltage comparator having an inverting input connected to a connection point between said first diode and said second resistor, a noninverting input receiving the reference voltage, and an output connected to said second input of said second AND element;
   a monitoring unit having a first input connected to said output of said first voltage comparator, a second input connected to said output of said second voltage comparator, a third input connected to said inverting input of said second voltage comparator, a fourth input for receiving a second reference voltage, and an output outputting a status signal; and
   a plurality of single transformers each being wound inphase and having a primary winding and a secondary winding, a start of said secondary winding of each of said single transformers connected through one of said single diodes to a positive terminal of a single one of said capacitors, and an end of said secondary winding in each case connected directly to a negative terminal of said single capacitor assigned to it, said primary winding of said single transformers connected in parallel with each other, and a common start of said primary winding connected to a connection point between said first diode and said second resistor and a common end of said primary winding connected to the negative terminal and to said end of said secondary winding of said flyback transformer.

2. The device according to claim 1, wherein said single transformers and said single diodes are disposed together with the capacitors in a housing of the double layer capacitor.

3. The device according to claim 1, further comprising a two-wire bus cable connecting said flyback transformer to said single transformers.

4. The device according to claim 1, further comprising a first capacitor having a first terminal connected to a cathode terminal of said first diode and a second terminal connected to the negative terminal.

5. A method for operating the device according to claim 1, which comprises the steps of:
   performing an operation in a self-controlled manner, which includes the steps of:
      putting the switching transistor in a conducting state upon receiving the external control signal and upon a voltage at the secondary winding of the flyback transformer lying beneath a first predefined value;
      putting the switching transistor in a nonconducting state if a current flowing through the primary winding of the flyback transformer reaches a second predefined value; and
      maintaining the switching transistor in the nonconducting state as long as the voltage at the secondary winding of the flyback transformer exceeds the first predefined value or the external control signal is no longer present.

6. A method for operating the device according to claim 1, which comprises the steps:
   measuring a first signal duration, corresponding to a charging time, at the output of the first voltage comparator;
   measuring a second signal duration, corresponding to a discharging time of the flyback transformer, at the output of the second voltage comparator;
   comparing each of the first signal duration and the second signal duration with an upper and a lower limit value in the monitoring circuit;
   determining that the double layer capacitor and the device for equalizing the charge are in a perfect state as long as the first and second signal durations lie within the upper and lower limit values; and
   outputting, through the monitoring circuit, the status signal indicating a presence of the perfect state.

7. The method according to claim 6, which further comprises:
   measuring an amplitude of a rectified discharging voltage, being measured after a transient reaction;
   comparing the amplitude with an upper and a lower limit value in the monitoring circuit;
   determining that the double layer capacitor is in the perfect state as long as the amplitude lies within the upper and lower limit values; and
   outputting from the monitoring circuit the status signal indicating a presence of the perfect state.

8. A method for operating the device according to claim 1, which comprises the steps:
   measuring an amplitude of a rectified discharging voltage, during a discharging operation of the flyback transformer after a transient reaction, the amplitude being proportional to a currently lowest voltage of the single capacitor of the double layer capacitor.

9. The method according to claim 8, which further comprises:
   comparing the amplitude with an upper and a lower limit value in the monitoring circuit;

determining that the double layer capacitor is in a perfect state as long as the amplitude lies within the upper and lower limit values; and outputting from the monitoring circuit the status signal indicating a presence of the perfect state.

10. A device for equalizing a charge of serially connected capacitors belonging to a double layer capacitor, the double layer capacitor further having a positive terminal and a negative terminal, the device comprising:

a plurality of single diodes;

a switching transistor having a collector/drain terminal, a base/gate terminal and an emitter/source terminal;

a first diode;

a first resistor having a first terminal and a second terminal connected to the negative terminal of the double layer capacitor;

a second resistor having a first terminal and a second terminal connected to the negative terminal of the double layer capacitor;

a third resistor having a first terminal and a second terminal;

an inductor having a first terminal connected to the positive terminal of the double layer capacitor and a second terminal connected to said collector/drain terminal of said switching transistor, a PNP transistor having a base terminal connected to said first terminal of said inductor, an emitter terminal connected through said third resistor and said first diode to said second terminal of said inductor, and a collector terminal connected through said second resistor to the negative terminal of the double layer capacitor;

a first voltage comparator having an inverting input connected both to said emitter/source terminal of said switching transistor and said first resistor, an non-inverting input for receiving a first reference voltage, and an output;

a first AND element having an output connected to said base/gate terminal of said switching transistor, a first input for receiving an external control signal, and a second input;

a second AND element having an output connected to said second input of said first AND element, a first input connected to said output of said first voltage comparator, and a second input;

a second voltage comparator having an inverting input connected to a connection point between said collector of said PNP transistor and said second resistor, a non-inverting input for receiving the first reference voltage, and an output connected to said second input of said second AND element;

a monitoring unit having a first input connected to said output of said first voltage comparator, a second input connected to said output of said second voltage comparator, a third input connected to said inverting input of said second voltage comparator, a fourth input for receiving a second reference voltage, and an output outputting a status signal; and a plurality of single transformers each being wound inphase, each of said single transformers having a secondary winding with a start of said secondary winding of each said single transformer being connected through one of said single diodes to the positive terminal of one of said capacitors, and an end of said secondary winding connected directly to the negative terminal of said capacitor, said single transformers having primary windings connected in parallel, said primary windings having a common start connected to a connection point between said first diode and said third resistor and a common end of said primary windings connected to the positive terminal of the double layer capacitor and to said first terminal of said inductor.

11. The device according to claim 10, wherein said single transformers and said single diodes are disposed together with said capacitors in a housing of the double layer capacitor.

12. The device according to claim 10, further comprising a two-wire bus cable connecting said inductor to said single transformers.

13. The device according to claim 10, further comprising a first capacitor having a first terminal connected to a cathode terminal of said first diode and a second terminal connected to the positive terminal.

14. A method for operating the device according to claim 10, which comprises the steps of:

performing an operation in a self-controlled manner, which includes the steps of:

putting the switching transistor in a conducting state upon receiving the external control signal and upon a voltage at the inductor lying beneath a first predefined value;

putting the switching transistor in a nonconducting state if a current flowing through the primary winding of the inductor reaches a second predefined value; and maintaining the switching transistor in the nonconducting state as long as the voltage at the inductor exceeds the first predefined value or the external control signal is no longer present.

15. A method for operating the device according to claim 10, which comprises the steps:

measuring a first signal duration, corresponding to a charging time, at the output of the first voltage comparator;

measuring a second signal duration, corresponding to a discharging time of the inductor, at the output of the second voltage comparator;

comparing each of the first signal duration and the second signal duration with an upper and a lower limit value in the monitoring circuit;

determining that the double layer capacitor and the device for equalizing the charge are in a perfect state as long as the first and second signal durations lie within the upper and lower limit values; and outputting, through the monitoring circuit, the status signal identify a presence of the perfect state.

16. The method according to claim 15, which further comprises:

measuring an amplitude of a rectified discharging voltage, being measured after a transient reaction;

comparing the amplitude with an upper and a lower limit value in the monitoring circuit;

determining that the double layer capacitor is in the perfect state as long as the amplitude lies within the upper and lower limit values; and outputting from the monitoring circuit the status signal identifying a presence of the perfect state.

17. A method for operating the device according to claim 10, which comprises the steps:

measuring an amplitude of a rectified discharging voltage, during a discharging operation of the inductor after a transient reaction, the amplitude being proportional to a currently lowest voltage of a single capacitor of the double layer capacitor.

18. The method according to claim 17, which further comprises:
comparing the amplitude with an upper and a lower limit value in the monitoring circuit;
determining that the double layer capacitor is in the perfect state as long as the amplitude lies within the upper and lower limit values; and
outputting from the monitoring circuit the status signal indicating a presence of the perfect state.

* * * * *